United States Patent [19]
Baumgartner

[11] 3,876,021
[45] Apr. 8, 1975

[54] DRIVE CONTROL APPARATUS FOR VEHICLES
[75] Inventor: Darrell E. Baumgartner, Owatonna, Minn.
[73] Assignee: Owatonna Manufacturing Company, Inc., Owatonna, Minn.
[22] Filed: Jan. 21, 1974
[21] Appl. No.: 435,248

[52] U.S. Cl............................. 180/6.48; 74/471 R
[51] Int. Cl............................................ B62d 11/04
[58] Field of Search.......... 180/6.48; 74/471 R, 491

[56] References Cited
UNITED STATES PATENTS
3,666,033  5/1972  Haug.................................. 180/6.48
3,776,325  12/1973  Jepersen........................... 180/6.48

Primary Examiner—David Schonberg
Assistant Examiner—J. A. Pekar
Attorney, Agent, or Firm—Merchant, Gould, Smith & Edell

[57] ABSTRACT

Control apparatus including a control shaft rotated on its own axis by a steering wheel and pivotally moved on a different axis by a speed control lever each movable in opposite directions from a neutral position, for a pair of hydrostatic transmission mechanisms each including a fluid pump and a cooperating fluid operated motor, each motor being operatively coupled to a different one of a pair of laterally spaced drive wheels. Each transmission mechanism is controlled directly by a respective one of a pair of pivotally mounted control arms, each control arm being connected by one of a pair of links to crank arm mounted on the control shaft.

5 Claims, 4 Drawing Figures

PATENTED APR 8 1975

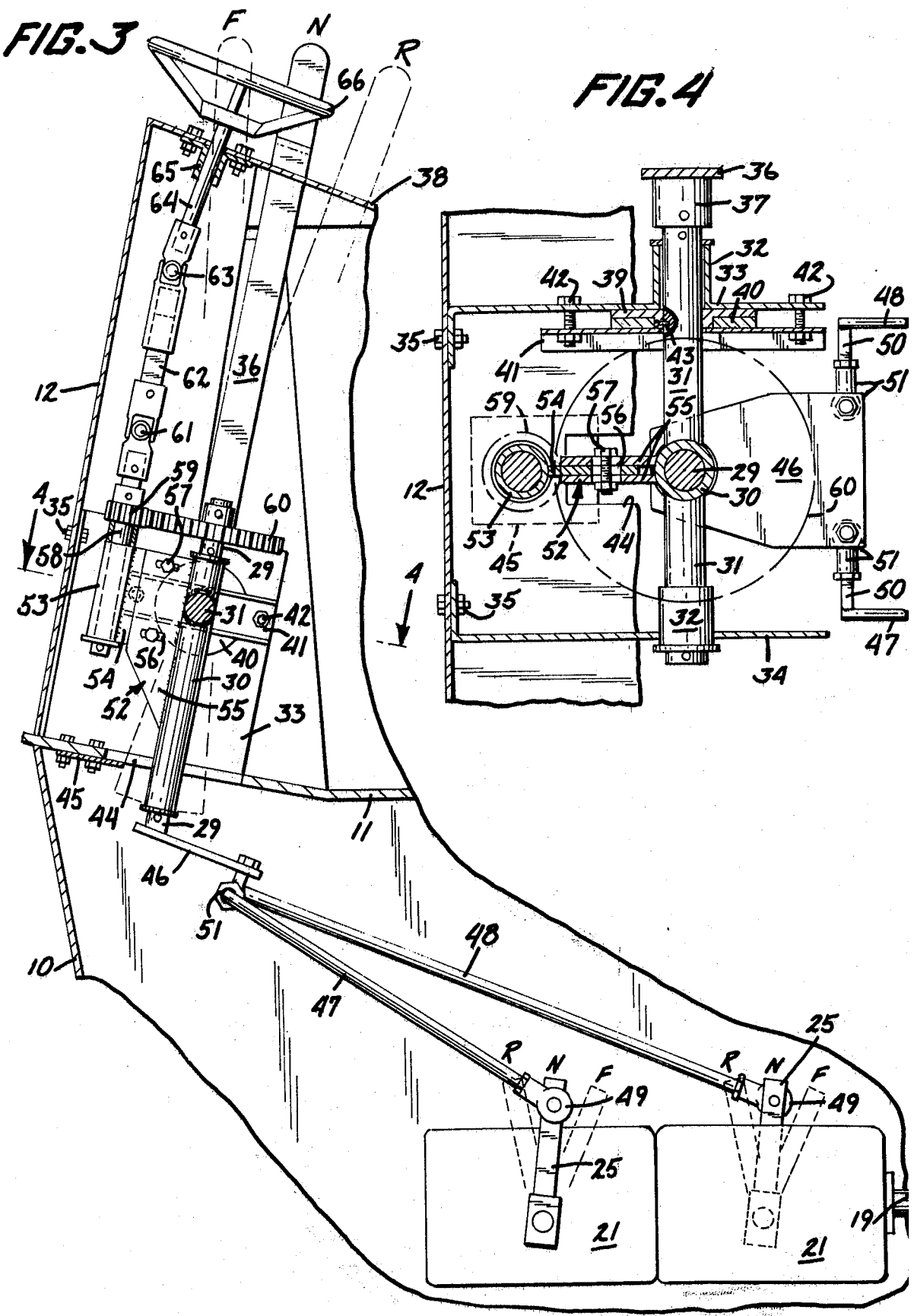

DRIVE CONTROL APPARATUS FOR VEHICLES

BACKGROUND OF THE INVENTION

This invention relates to the control of speed and steering of vehicles, such as tractors of the type wherein a pair of laterally spaced wheels are individually driven, and wherein steering of the vehicle is controlled by a differential in speed between the driven wheels.

The present invention is in the nature of an improvement over control mechanisms of the general type disclosed in U.S. Pat. Nos. 3,461,669 to G. G. Kanengeiter, 3,581,497 to F. C. Krumholz, and 3,647,011 to applicant, as well as copending application of Paul D. Gray, filed May 19, 1972, Ser. No. 255,142 and entitled "Drive Control Apparatus for Vehicles." All of these are assigned to the assignee company of this invention, and all relate to mechanisms for controlling operation of hydrostatic transmissions.

SUMMARY OF THE INVENTION

An important object of this invention is the provision of a control apparatus which provides for precise steering of a vehicle in either forward or reverse directions.

Another is the provision of a control for hydrostatic drive transmission mechanisms which is highly simplified in construction and in its operation.

Specifically, the control apparatus of this invention is used in connection with the control arms of a pair of variable displacement fluid pressure mechanisms, the arms being movable between neutral positions and full forward and reverse positions to control the direction and speed of drive wheels of a vehicle. The control apparatus involves a control shaft that is journaled for rotation on its own axis and that is pivotally movable on an axis normal to its axis of rotation. A speed control lever operates to impart pivotal movements to the control shaft, and a steering wheel is operatively coupled to the control shaft by reducing gears to impart rotary movements to the control shaft. A crank arm is connected to the control shaft and has spaced apart portions connected to a pair of rigid links each of which extends to, and is connected to, a different one of the control arms of the hydrostatic transmission mechanisms. In the neutral position of the hydrostatic control arms, the crank arm extends from the control shaft generally between the links and generally parallel to the links, the links being connected to the crank arm by swivel connections and in spaced apart relationship in the direction of rotary movement of the control shaft. The spacing between the swivel connections on the crank arm is considerably less than the distance between the axis of rotation of the control shaft and either of the swivel connections. This arrangement, coupled with the reduction gearing between the steering wheel and the control shaft, provides for a very delicate and precise control over the hydrostatic transmission mechanism for steering of the vehicle at different speeds, and contributes in a large degree to the safety of operation of the vehicle.

DESCRIPTION OF THE DRAWINGS

FIG. 3 is an enlarged fragmentary section taken generally on the line 3—3 of FIG. 1; and FIG. 4 is a still further enlarged fragmentary section taken generally on the line 4—4 of FIG. 3.

DETAILED DESCRIPTION OF THE PREFERRED EMBODIMENT

Figure 1:
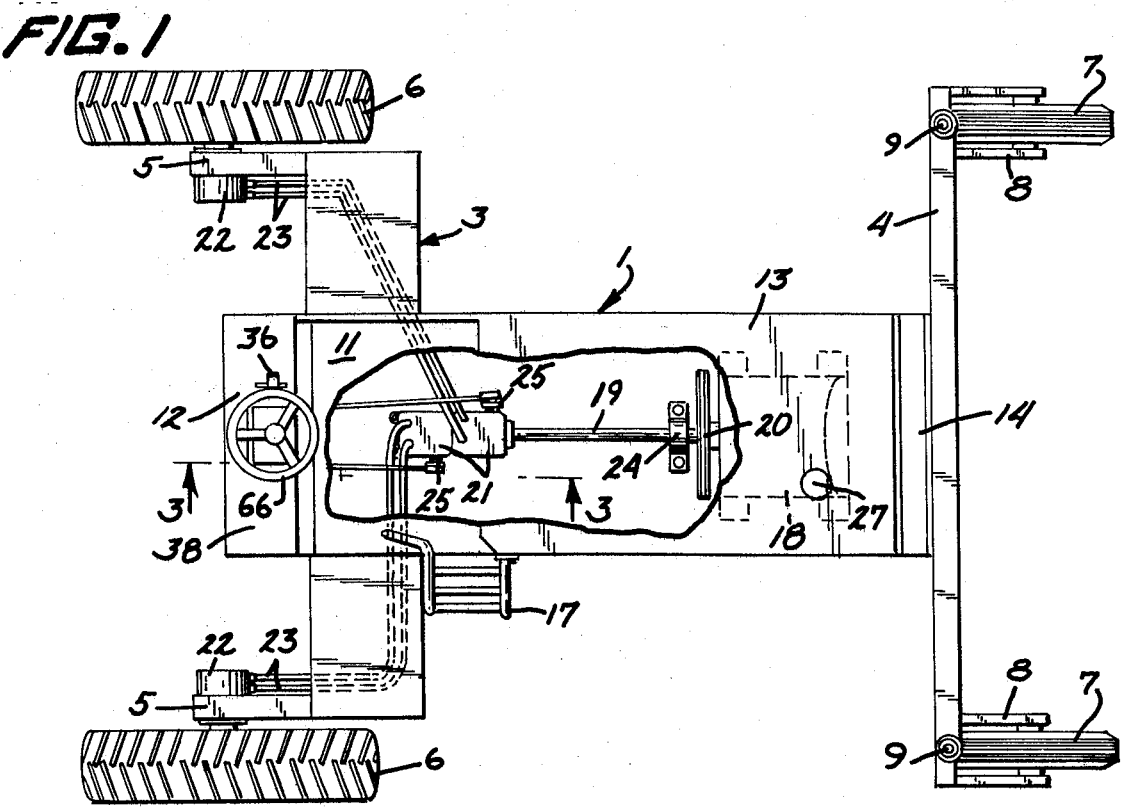
FIG. 1 is a view in top plan of a vehicle, such as a tractor, including the control apparatus of this invention, some parts being broken away.

In the drawings, a vehicle such as a tractor or the like, is indicated at 1, the same comprising a chassis 2 which includes front and rear cross arms 3 and 4 respectively. The front crossarm 3 is provided at its opposite ends with depending legs 5 at the lower ends of which are journaled drive wheels 6. A pair of laterally spaced caster wheels 7 are journaled in forks 8 each having a vertically disposed mounting shaft 9, journaled in an opposite end of the rear cross arm 4. Frame structure mounted on the chassis 2 includes a front housing 10 on which is mounted a floor or deck 11, a front pedestal 12, a hood 13, and a rear frame member 14. The floor 11, pedestal 12 and the front end of the hood 13 define an operator's station, one side of which is closed by a wall 15, the opposite side being open. An operator's seat 16 is suitably mounted for convenience of the operator and a ladder 17 is provided for easy access to the driver's or operator's station.

Figure 2:
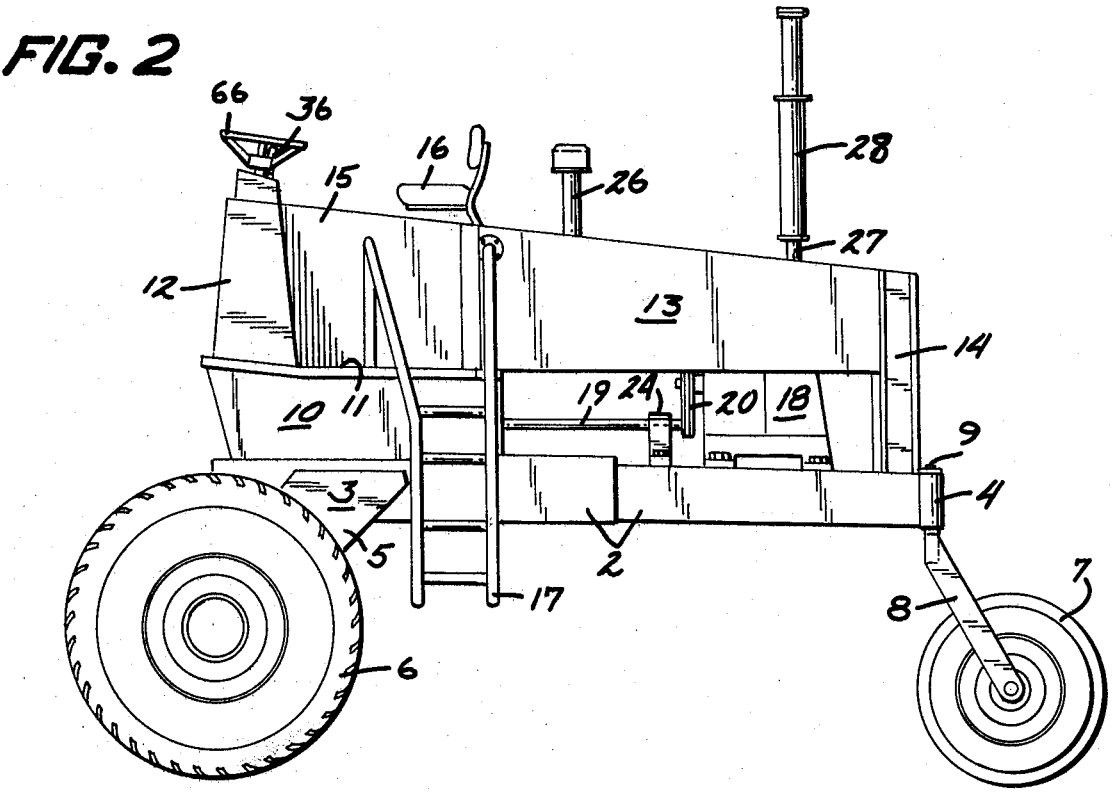
FIG. 2 is a view in side elevation.

The vehicle 1 is propelled by means including a conventional internal combustion engine 18, a drive shaft 19 operatively connected to the output shaft of the engine 18 by conventional belt and pulley connections indicated generally at 20, and a pair of hydrostatic drive mechanisms each including a fluid pump 21 and a fluid pressure operated motor 22. Alternatively, the drive shaft 19 may be coupled directly to the output shaft of the engine 18. As shown in FIG. 1, each motor 22 is associated with a different one of the drive wheels 6 to impart driving rotation thereto independently of the other motor 22. The pumps 21 and motors 22 are convention in nature, the pumps 21 being of the variable displacement type. Each pump 21 is connected to its respective motor 22 by fluid lines 23. The drive shaft 19 is journaled adjacent its rear end in a bracket 24, the drive shaft 19 being operatively connected at its front end to the pumps 21, to drive the same. Each of the pumps 21 is provided with a respective control arm 25, the control arms 25 being movable between a neutral position shown by full lines in FIG. 3 and indicated at N, and forward and reverse positions shown by dotted lines in FIG. 3 and indicated at F and R respectively. The arms 25 control pump output and therefore flow of fluid to their respective motors 22 to cause operation thereof in forward or reverse directions and at variable speeds in these directions from the neutral position of the arms 25 wherein the motors 22 are at rest. The pumps 21 and motors 22, together with the control arms 25 are of types well known to those familiar with the art, and in and of themselves, do not comprise the instant invention. Hence, further detailed showing and description thereof is omitted, in the interest of brevity. A conventional air cleaner equipped air inlet tube 26, shown in FIG. 2, may be assumed to furnish combustion supporting air to the engine 18, an exhaust pipe 27 being shown as provided with a conventional muffler 28.

The control apparatus of this invention involves a control shaft 29 that is journaled in a tubular bearing 30 on an axis that extends generally upwardly and downwardly, the tubular bearing having a pair of axially aligned cross shafts 31, the aligned axes of which are disposed normal or at right angles to the axis of the control shaft 29. The cross shafts 31 act as trunnions for pivotal movement of the control shaft 29 and tubular bearing 30, being journaled in bearings 32 that are mounted on plate-like support members 33 and 34, these being secured to the pedestal 12 by nut-equipped bolts or the like 35. An elongated speed control lever extends generally upwardly with respect to the pedestal 12 and has its lower end provided with a hollow boss 37 that is pinned or otherwise rigidly secured to one of the trunnions 31, see particularly FIG. 4. The control lever 36 extends upwardly through a suitable opening in the top wall 38 of the pedestal 12, the upper end of the control lever 36 being of easy access to the operator on the seat 16. In the embodiment illustrated, a pair of friction washers 39 and 40 are disposed between the support member 33 and a channel member 41 that is adjustably secured to the support member 33 by nut-equipped screws or the like 42. The friction washer 39 is secured to the adjacent trunnion 31 by means of a set screw 43 or other suitable means, the washer 40 being adhered or otherwise rigidly secured to the channel member 41. As shown in FIG. 3, the speed control lever 36 is movable between a neutral position, indicated at N and forward and reverse positions indicated at F and R respectively, the friction washers 39 and 40 operating to hold the tube or bearing 30 and control shaft 29 in desired set positions of angular movement with respect to the axis of the trunnions 31. As shown in FIGS. 3 and 4, the tubular bearing 30 and control shaft 29 extend downwardly through an opening 44 in the deck 11, a stop plate 45 being secured adjacent the front end of the opening 44 to limit pivotal movement of the control shaft 29 in a reverse direction.

A plate-like crank member 46 has its radially inner end portion rigidly secured to the lower end of the control shaft 29, and extends generally radially rearwardly therefrom toward the fluid pump 21. A pair of rigid links 47 and 48 extend generally longitudinally of the tractor 1 and have rear ends each attached to the radially outer ends of the hydrostatic control arms 25 by swivel connectors 49. At their front ends, the links 47 and 48 have inturned portions 50 that are pivotally connected to radially outer end portions of the crank member 46 by swivel connectors 51. As will be hereinafter described, when the control shaft 29 is disposed in a neutral position of rotary movement thereof on its own axis, the crank member 46 extends radially from the control shaft 29 in a rearward direction generally parallel to the longitudinal dimensions of the links 47 and 48, the pivotal connections of the swivel connectors 51 being disposed on opposite sides of a center line extending longitudinally of the machine and intersecting the axis of the control shaft 29. With reference particularly to FIG. 4, it will be seen that the connections of the swivel connectors 51 to the crank member 46 are spaced apart a distance substantially less than the distance between the axis of the control shaft 29 and either of the connections of the swivel connectors 51.

The tubular bearing 30 comprises a portion of a bearing bracket, indicated in its entirety at 52, the same including a second tubular bearing 53 having a plate-like flange 54 extending radially outwardly therefrom and between a pair of laterally spaced plate-like flanges 55 projecting radially outwardly from the tubular bearing 30 and having slots 56 therein aligned with similar slots in the flange 54. Nut-equipped locking bolts 57 extend through the slots 56 and the slots in the flange 54 to hold the tubular bearings 30 and 53 in desired spaced apart parallel relationship. The tubular bearing 53 journals a jackshaft 58 on which is mounted a relatively small diameter toothed pinion 59 that has meshing engagement with a relatively large diameter toothed gear 60 pinned or otherwise rigidly secured on the control shaft 29. A universal coupling 61 is secured to the upper end of the jackshaft 58 above the pinion 59, and is connected to one end of a cross-sectionally rectangular shaft extension member 62 that is connected to one end of a second universal coupling 63 for common rotation therewith and for axial sliding movements relative thereto. A steering shaft 64 is rigidly connected to the upper end of the universal coupling 63, and is journaled in a bearing 65 secured to the top wall 38 of the pedestal 12. The shaft 64 extends upwardly through the top wall 38 and has secured to its upper end a steering wheel 66. The universal couplings 61 and 63, together with the shaft extension member 62, permit rotary movement to be imparted to the control shaft 29 from the steering wheel 66 in any position of pivotal movement of the control shaft 29 on the axis of the trunnions 31.

OPERATION

Assuming that the engine 18 is running, and that the drive shaft 19 is rotating, the vehicle or tractor 1 will remain at a standstill when the speed control lever 36 is in its full line position of FIG. 3 and when the crank member 46 is disposed in its neutral steering position shown in FIG. 4. By moving the speed control lever 36 toward its forward position F, the control shaft 29 will move pivotally on the axis of the trunnions 31 to move both links 47 and 48 simultaneously rearwardly toward the forward positions F of the control arms 25. This being done, the fluid motors 22 will be operated at a selected equal speed to cause the tractor 1 to move forwardly in a straight line. When the steering wheel 66 is rotated in one direction, for the purpose of causing the tractor 1 to move in a curved path, rotation of the pinion 59 will impart rotation to the gear 60 in the opposite direction, to move the crank member 46 pivotally about the axis of the control shaft 29. Assuming that the control shaft 29 and crank member 46 are caused to rotate in a clockwise direction with respect to FIG. 4, the adjacent front end portion of the link 47 will be moved angularly outwardly and forwardly to move its respective pump control arm 25 toward a neutral or reverse direction, while the front end portion of the link 48 is moved laterally inwardly and very slightly rearwardly to move its respective pump control arm 25 slightly toward its forward position, thus causing the tractor 1 to move in a counterclockwise direction with respect to FIG. 1. In view of the fact that the gear 60 rotates in a reverse direction than the pinion 59, it will be appreciated that, when the steering wheel 66 is rotated in a counterclockwise direction with respect to FIG. 1, the tractor 1 will turn in a counterclockwise direction.

It will be appreciated that, with the connections of the links 47 and 48 to the crank member being disposed as above described, the differential of movement between the two control arms 25 is initially quite small, and such differential remains quite small over the entire range of steering rotation of the control shaft 29 on its own axis. Further, the differential in size between the pinion 59 and gear 60 is such that the steering wheel 66 may be rotated to a substantial angular degree to produce a relatively small degree of steering movement between the control arms 25. Preferably, and as shown, the pitch diameter of the gear 60 is approximately four times as great as that of the pinion 59. When the tractor 1 is at a standstill with the speed control lever 36 in its neutral position, initial rotation of the steering wheel 66 will cause the vehicle 1 to steer about an exceedingly small turning radius, in view of the fact that one of the wheels 6 will be caused to turn forwardly while the other turns rearwardly. As the steering wheel 66 is turned further, the rearwardly rotating wheel 6 will come to a standstill and then rotate in the same direction as the forwardly rotating wheel, but at a slower speed, thus causing the tractor 1 to steer in a larger diameter turning circle. During forward or rearward movement of the vehicle, both of the control arms 25 are positioned away from their neutral positions, and when steering rotation is then imparted to the control shaft 29, one of the drive wheels 6 will be caused to rotate somewhat slower than normal, the other drive wheel 6 being caused to rotate faster but not to the extent that the one drive wheel 6 is retarded. Thus, at a standstill or when in motion, steering of the tractor 1 is achieved with a high degree of safety and precision. Further, by controlling the speed of the drive wheels with the use only of the speed control lever, the engine 18 may be operated at a constant optimum speed at all times for maximum efficiency.

It will be appreciated that any suitable and well known means may be substituted for the friction washers 39 and 40 to hold the tubular bearing 30 and control shaft 29 in their various positions of angular movement to control the direction and speed of the tractor 1. Such means, not shown, may be applied to the speed control lever 36, if desired.

While I have shown and described a commercial embodiment of my control apparatus for hydrostatic transmissions, it will be understood that the same is capable of modification, without departure from the spirit and scope of the invention, as defined in the claims.

What is claimed is:

1. A control apparatus for a pair of hydrostatic transmissions each comprising a motor driven pump, a fluid pressure operated motor operatively connected to a respective pump, and a control arm movable between a neutral position and full forward and reverse positions, said control system comprising:
    a. a pair of laterally spaced elongated control links each having swivel means at its opposite ends for connection of one end of each link to the control arm of a different one of said transmissions, said links extending generally in the same direction from the control arms;
    b. a control shaft extending in a direction generally transversely of said links;
    c. mounting means including a frame structure, a bearing bracket mounting said control shaft for rotation on its own axis in opposite directions from a neutral position, and aligned trunnions associated with said bearing bracket and frame structure mounting said bearing bracket and control shaft for pivotal movements in opposite directions from a neutral position on a generally horizontal axis normal to the control shaft axis and transversely with respect to said links;
    d. a crank member having an inner end secured to and extending generally radially of said control shaft and generally longitudinally of said links when said control shaft is in its neutral position of rotary movement;
    e. the swivel means at the other end of each of said links being connected to the radially outer end of said crank member in spaced apart relationship circumferentially relative to the axis of rotation of the control shaft, the circumferential distance between the swivel means connections to said crank member being substantially less than the distance between the axis of said control shaft and said swivel means connections to the crank member;
    f. and means for imparting said rotary and pivotal movement independently to said control shaft and including a control lever operatively connected to said trunnions.

2. The control apparatus defined in claim 1 in which said means for imparting rotary movement to said control shaft comprises a steering rod journaled in the frame structure on a fixed axis, a jack shaft journaled in said bearing bracket in spaced relation to said control shaft, flexible drive connections between said steering rod and jack shaft, and gearing connecting said jack shaft to said control shaft.

3. The control apparatus defined in claim 2 in which said gearing comprises a relatively small diameter pinion on said jack shaft and a relatively large diameter gear on said control shaft in meshing engagement with said pinion.

4. Control apparatus for a pair of hydraulic drive mechanisms for a vehicle including a frame and a pair of rotary members at opposite sides of the frame, said drive mechanisms each including a hydraulic drive motor connected to a different one of the rotary members and a fluid pump hydraulically connected to a respective motor, said mechanims being of variable displacement and each having one of a pair of pivotally mounted displacement control arms thereon, each control arm being movable selectively in opposite directions from a neutral position and generally in the direction of movement of the vehicle to control operation of its respective mechanism to impart infinitely variable speed to its respective rotary member selectively in forward and reverse directions from a neutral motionless condition, and means for driving said pumps, said control apparatus comprising:
    a. a steering post journaled in said frame structure for rotation on its axis;
    b. a control shaft extending in a direction generally normal to the direction of movement of the vehicle;
    c. means mounting said control shaft in said frame for rotary movements on its own axis and for pivotal movements on an axis normal to its own axis and to the direction of movement of the vehicle;
    d. means operatively connecting said control shaft to said steering post for imparting rotary movement to said control shaft selectively in opposite directions from a neutral position responsive to rotation of said steering post on its axis;
    e. means including a speed control member for imparting said pivotal movements to the control shaft on said axis normal to its own axis;

f. a pair of laterally spaced control links each having a swivel connection at one end to a different one of said control arms and extending therefrom generally in the direction of vehicle movement toward said control shaft;

g. a crank member mounted on said control shaft for common movements therewith and extending generally radially therefrom in a direction generally parallel to the longitudinal dimension of said links and generally in the direction of vehicle movement when said control shaft is in said neutral position thereof;

h. the swivel means connecting the other ends of said links to the radially outer portion of said crank member in spaced apart relationship circumferentially relative to the axis of rotation of the control shaft and at opposite sides of a center line intersecting the axis of the control shaft and extending generally in said direction of vehicle movement when said control shaft is in its neutral position, the circumferential distance between said swivel means connections to the crank member being substantially less than the distance between the axis of said control shaft and said swivel means connections to the crank member.

5. The control apparatus defined in claim 4 in which said means operatively connecting the control shaft to said steering post comprises, a jack shaft flexibly connected to said steering post and journaled in the control shaft mounting means, a relatively small diameter pinion on said jack shaft, and a relatively large diameter gear on said control shaft in meshing engagement with said pinion.

* * * * *